United States Patent

[11] 3,593,316

[72] Inventors Neil G. Frieband
Framingham;
Douglas O. Kendrick, Northborough;
James F. Upton, Sudbury, all of, Mass.
[21] Appl. No. 873,356
[22] Filed Nov. 3, 1969
[45] Patented July 13, 1971
[73] Assignee Incoterm Corporation
Weston, Mass.

[54] DATA TERMINAL PROCESSOR
20 Claims, 6 Drawing Figs.

[52] U.S. Cl. .......... 340/172.5, 340/324.1
[51] Int. Cl. .......... G06f 3/14, G06f 15/16
[50] Field of Search .......... 340/172.5, 324.1; 235/157

[56] References Cited
UNITED STATES PATENTS

| | | | |
|---|---|---|---|
| 3,346,853 | 10/1967 | Koster et al. | 340/172.5 |
| 3,380,031 | 4/1968 | Clayton et al. | 340/172.5 |
| 3,505,665 | 4/1970 | Lasoff et al. | 340/324 |
| 3,524,182 | 8/1970 | Criscimagna et al. | 340/324 |

*Primary Examiner*—Gareth D. Shaw
*Attorney*—Kenway, Jenney and Hildreth

ABSTRACT: A data terminal processor has a combined arrangement of computational logic components and display-refreshing logic components which enables it to perform both computational and display-refreshing operations with many of the same components, particularly the arithmetic and memory components. The processor monitors the projection of display lines and the sweep of the traces forming display lines to change between the compute mode of operation and the refresh mode during the sweep of interline spaces and the sweep of lines outside the display lines that are to be used. Further, the processor operates in the refresh mode without recourse to the program counter or accumulator, and hence compute-mode information stored therein is ready for immediate use upon the resumption of computational operations.

INVENTORS
NEIL G. FRIEBAND
DOUGLAS O. KENDRICK
JAMES F. UPTON
BY Jenney, Jenney & Hildreth
ATTORNEYS INVENTORS
NEIL G. FRIEBAND
DOUGLAS O. KENDRICK
JAMES F. UPTON
BY Conway, Jenney & Hildreth
ATTORNEYS INVENTORS
NEIL G. FRIEBAND
DOUGLAS O. KENDRICK
JAMES F. UPTON
BY Kenway, Jenney & Hildreth
ATTORNEYS INVENTORS
NEIL G. FRIEBAND
DOUGLAS O. KENDRICK
JAMES F. UPTON
BY Kenway, Jenney & Hildreth
ATTORNEYS

DATA TERMINAL PROCESSOR

BACKGROUND OF THE INVENTION

This invention relates to an electric logic system for processing digital information in a data terminal. The logic system has a novel arrangement of logic components and it operates in novel sequences. This results in an advantageous flexibility of operations for the user, and in comparatively low cost.

A data terminal is a device used in electronic data processing systems for rendering output information from the system perceptible to the human operator, and for accepting new input information from the operator and applying it to the electronic system. A data terminal conventionally has a cathode ray tube on which it displays output information as alphanumeric characters, and has an operator-manipulated keyboard from which it accepts new information. Further, a data terminal generally is connected by way of telephone or other communication lines to communicate with other devices in the data processing system.

The invention more particularly provides a new digital processor for operating a data terminal. The processor is software programmable, as distinguished from the more limited flexibility of microprogrammable, for a variety of computational and display refreshing operations. Further, it incorporates the logic components for refresh operations in such a manner that a large number of the processor components are used to execute both compute and refresh operations. This results in cost savings in the manufacture of the processor.

Another feature of the data terminal processor is that it is free to perform compute operations during much of the operating time, i.e. during many time periods when the display unit associated with it is operating but not actually ready for refreshing characters being displayed.

In some instances of the prior art, a large general purpose computer which is assigned many chores in a data processing system devotes part of its time to servicing the display unit and keyboard unit of a data terminal for the system. In another instance, a separate small general purpose computer is assigned full-time to service the display and keyboard units of a data terminal; the general purpose computer then is exclusively part of the data terminal. In either case, the data terminal has extensive program flexibility and capability due to the nature of the general-purpose processor with which it operates. However, this is a costly arrangement because the general purpose computer has significantly more capacity and capability, for which the user is paying, than the display and keyboard units require. Hence the user is paying more than necessary for the performance he is getting.

Another typical prior art arrangement is to construct a data terminal with a special purpose processor to service the display and keyboard units. Such a data terminal can have a low purchase or rental price, but is in fact likely to be costly. This is because the special purpose processor is relatively inflexible in operation and hence the user has limited freedom to improve his system or to change its manner of operation for varied tasks. As a typical instance, prior art special purpose data terminal processors are usually too inflexible to operate with newer equipment or to operate with different routines required for meeting changing needs or for handling different kinds of data processing tasks.

Accordingly, it is an object of this invention to provide a data terminal for flexible programmable operation at considerably lower cost than heretofore available.

More particularly it is an object of the invention to provide a programmable data terminal processor which provides both computational and display-refreshing operations with a relatively small and low cost configuration of logic components.

Another object of the invention is to provide a data terminal processor having a combined arrangement of compute logic components and refresh logic components such that it performs both computational and refresh operations with many of the same components, particularly with the same arithmetic and memory components.

A further object of the invention is to provide a data terminal processor of the above character that is capable of performing compute operations during much of the time when the associated display unit is operating but not immediately ready to refresh the displayed information.

It is also an object of the invention to provide a data terminal processor of the above character having such an arrangement of computational and refresh logic components that it changes between performing computational operations and performing refresh operations with a minimal amount of transitional, housekeeping, operations.

Other objects of the invention will in part be obvious and will in part appear hereinafter.

The invention accordingly comprises the features of construction, combinations of elements, and arrangement of parts exemplified in the construction hereinafter set forth, and the scope of the invention is indicated in the claims.

GENERAL DESCRIPTION

In general, a data terminal embodying the invention has, as is generally conventional, a keyboard unit with a typewriter-like keyboard, a display unit with character generating circuits and a cathode ray display tube, and a communication unit for interfacing the terminal to transmit and receive information on communication lines. The terminal also has a processor having logic components conventional for a stored program processor; these include a memory address register, an addressable memory, a memory data register, an adder, an accumulator and a program counter. Further, the processor incorporates a small complement of additional logic components. Some are refresh-oriented and these include a cursor position register and a display position register. Other of the additional components are of a more general nature; one being an auxiliary arithmetic units. Finally, the processor has control circuits that schedule the execution of computational routines and, more important in the present context, control when the terminal is to perform refresh operations and, alternatively, when it is free to perform compute operations. The control unit is arranged also to provide novel sequences of refresh operations in the processor.

As indicated above, the components of the processor are interconnected, and operated by the control circuits, to perform essentially conventional compute operations and, further, to perform refresh operations with many of the same components required for computation. Further, the processor requires no housekeeping operations preparatory to transferring between refresh operations and compute operations. Thus, when the processor interrupts the execution of a compute routine to commence refresh operations, no information in the processor components needs to be transferred to other storage temporarily during the refresh operation and then reinstated at the end of the refresh operation. Instead, the present processor transfers between the compute and refresh modes of operation essentially immediately.

Further, the components of the processor are so arranged that the control circuits can monitor a relatively few items of information to enable the processor to perform compute operations whenever the display unit is not immediately ready to refresh displayed characters. Specifically, the processor is available for compute operations when the display unit is sweeping display lines on the cathode ray tube that are not to be used, and when it is sweeping the spaces between adjacent lines in which characters are being displayed. Also, the processor is free to compute when the display unit is returning the CRT electron beam to its "home" position.

BRIEF DESCRIPTION OF DRAWINGS

For a fuller understanding of the nature and objects of the invention, reference should be had to the following detailed description taken in connection with the accompanying drawings, in which.

DESCRIPTION OF SPECIFIC EMBODIMENT

A Data Processing System Having Data Terminals

Figure 1:
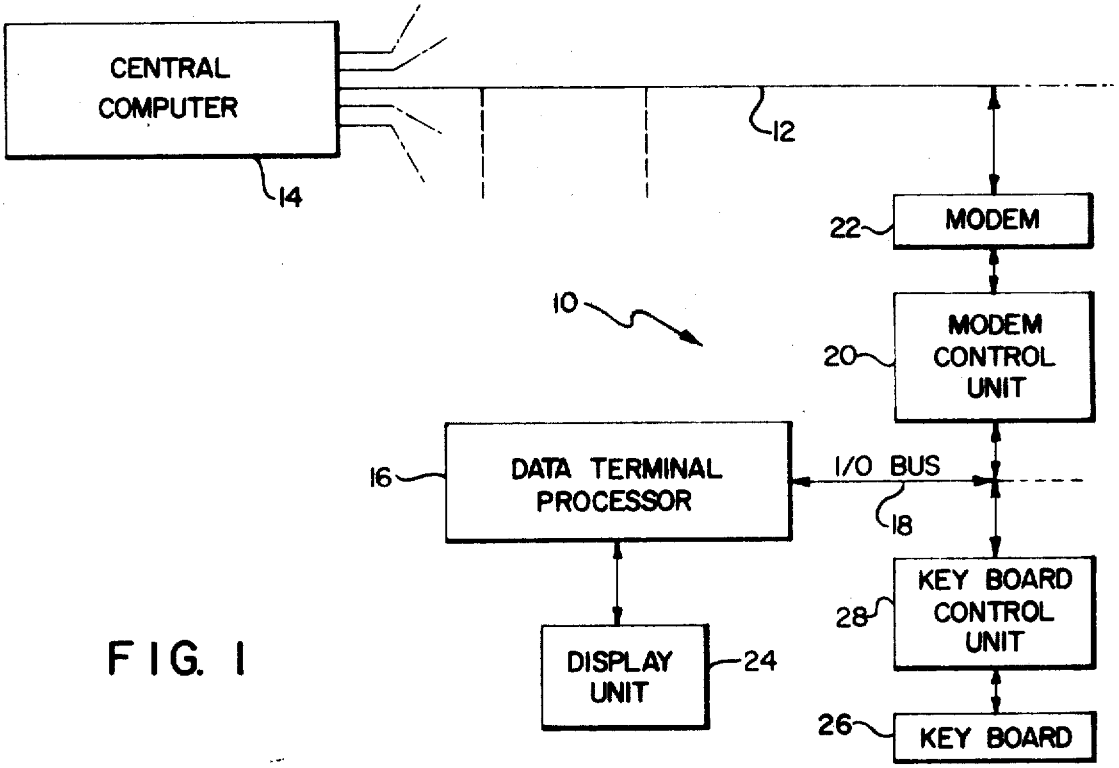
FIG. 1 is a block schematic diagram of a data terminal connected in a data processing system.

FIG. 1 shows a conventional data processing system in which a data terminal indicated generally at 10 connects by way of telephone lines 12 with a central computer 14. The illustrated terminal is one of many which connect to the central computer by way of the lines 12, and the central computer connects with other telephone lines, each of which in turn connects to further data terminals.

A data terminal processor 16 in the illustrated data terminal 10 sends information to, and receives information from, the central computer successively by way of an input/output bus 18 that connects to the processor, a modem control unit 20 connected to the bus, and a data modem 22 that connects to the telephone lines 12. The modem 22 performs the signal modulation and demodulation necessary to convert information between the digital format with which the rest of the data terminal operates and the pulse or other modulation according to which the signals are transmitted on the telephone lines 12.

The data terminal 10 also has a display unit 24 connected with the processor 16 and a keyboard 26 that connects to the processor 16 by way of a keyboard control unit 28 connected to the I/0 bus 18.

The data terminal typically operates to display on the display unit 24, usually on a televisionlike CRT screen, alphanumeric characters which the processor receives from the central computer 14 and from the keyboard 26. In addition, the terminal 10 sends to the computer 14 messages of alphanumeric characters which the operator types on the keyboard 26.

The DIsplay Unit

Figure 2:
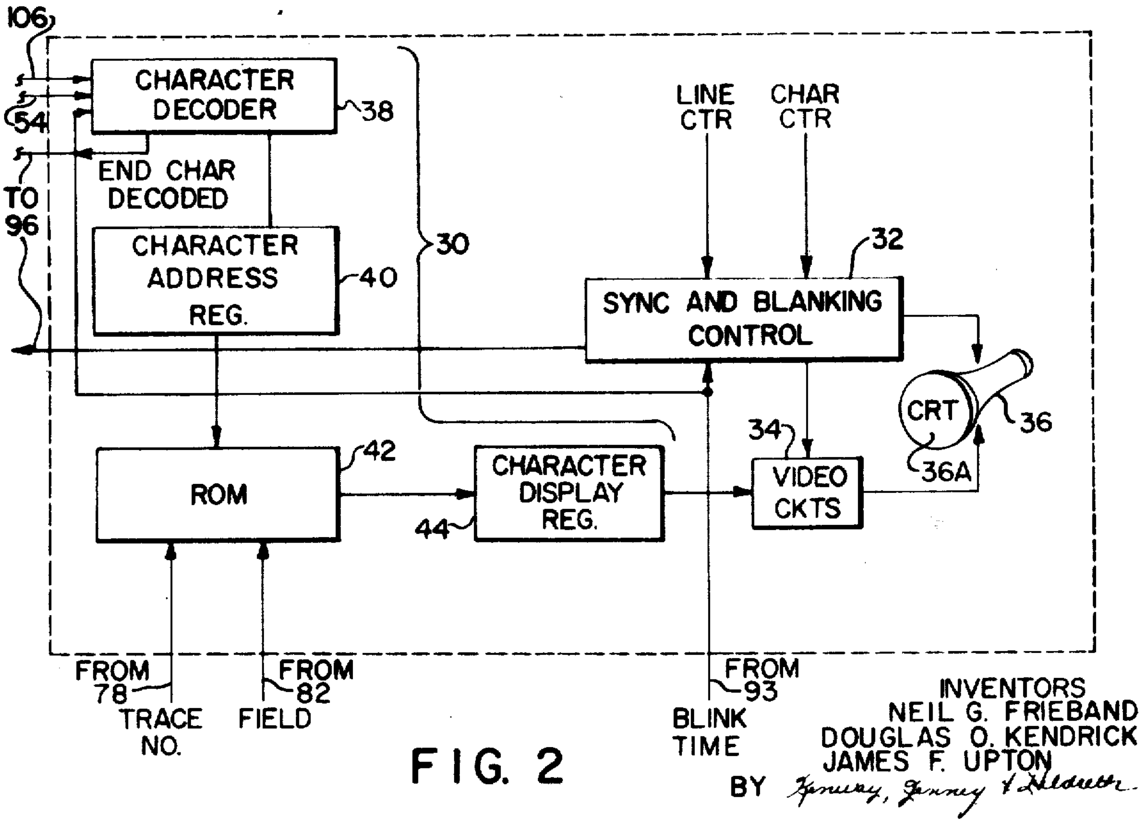
FIG. 2 is a block schematic diagram of an illustrative display unit for operation with a data terminal processor embodying the invention.

As shown in FIG. 2, the FIG. 1 display unit 24 typically has a character generator 30, and circuits including synchronizing and blanking control circuits 32 and video circuits 34 for operating a cathode ray tube 36 to display the desired characters on the display screen 36*a* of the CRT. The character generator 30 is illustrated as having a character decoder 38 that receives character-identifying signals from the processor 16 of FIG. 1 and in response applies to a character address register 40 digital signals identifying the specified character. A read-only memory 42 responds to these signals, and others which it receives from the processor, to generate the video intensity signals required for the cathode ray tube to display the specified character. A character display register 44 can be provided to buffer store these signals during application to the video circuits 34.

The foregoing description of the display unit, and the construction thereof shown in FIG. 2, are given only for the purpose of illustration and completeness, they themselves form no part of the present invention.

Processor Organization

Figure 3:
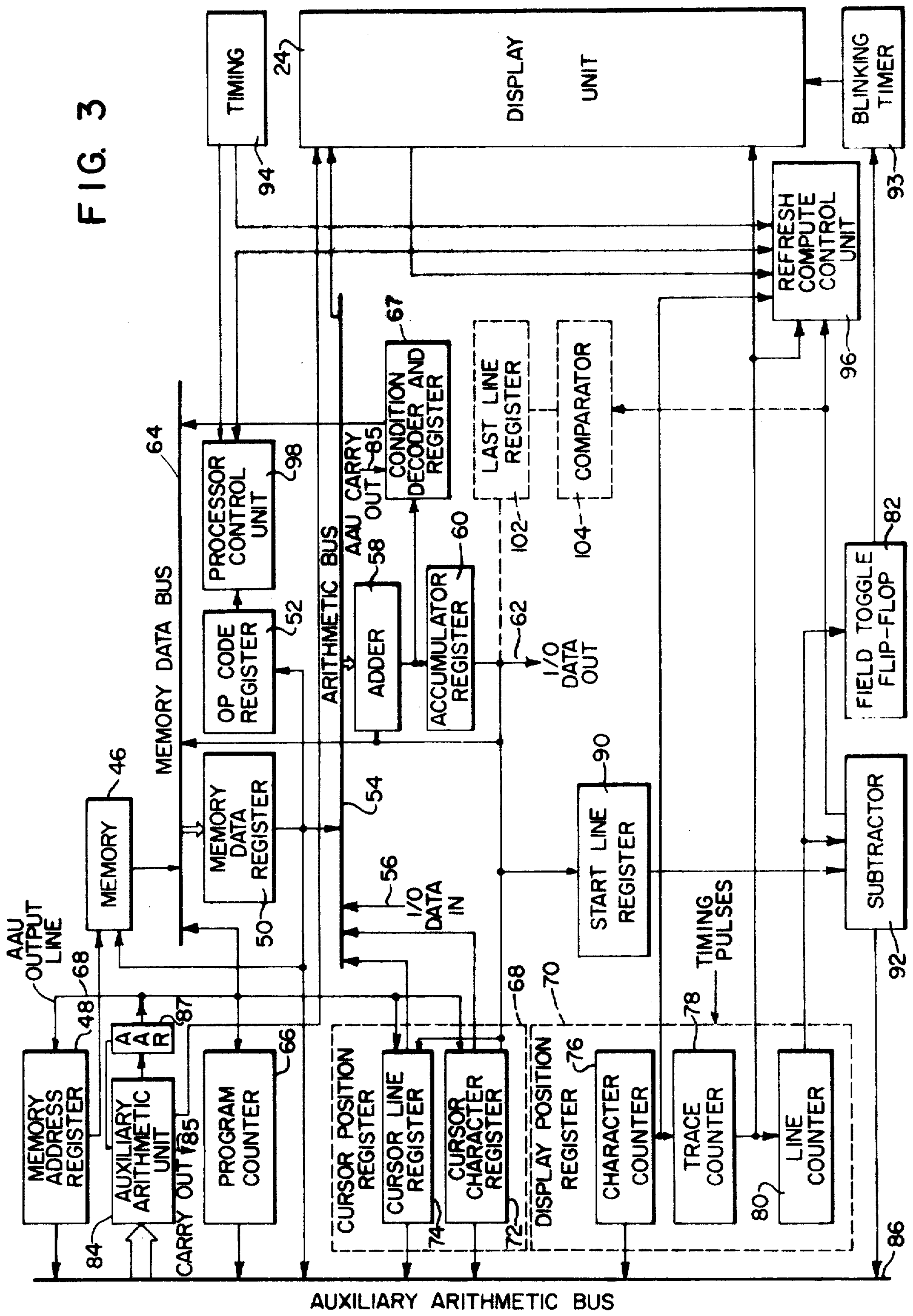
FIG. 3 is a block schematic diagram of a data terminal processor in accordance with the invention.

Turning to FIG. 3, the data terminal processor 16 of FIG. 1 has a random access memory 46 which receives address signals from a memory address register 48 and is connected to read information into, and alternatively write information from, a memory data register 50. An OP code register 52 is connected to receive the OP-code of instructions read into the memory data register from the memory 46.

The memory data register also applies information stored therein to an arithmetic bus 54 to which the conductors 56 of the I/0 bus 18 (FIG. 1) carrying data to the processor connect. An adder 58 has its input terminals connected to the bus 54 and its output terminals connected to an accumulator register 60. The output terminals of the accumulator register 60 are connected to the I/0 bus conductors 62 that carry data from the processor, to the adder 58, and to a memory data bus 64 to which the inputs of the memory data register 50 are connected.

The processor 16 is further illustrated as having a condition decoder and register 67 that receives signals from the adder 58 identifying when the adder has an overflow, when it produces a negative resultant, when it produces a zero resultant, and the like. The decoder and register 67 stores the identification of these conditions for application to the memory data bus 64.

The processor 16 also has, as shown on the left side of FIG. 3, a program counter 66, a cursor position register 68 and a display position register 70. The cursor position register 68 stores the identification of the position of the cursor on the display screen 36*a*. This is the position where the display unit would display a character if the operator were to depress a key on the keyboard.

The illustrated processor identifies this position, and other positions on the display screen 36*a*, with a binary "position" number in which the high order (most significant) bits identify a line on the screen 36*a*, with the lines being numbered starting from the top of the screen. The low-order bits of the position number identify a character-position along the identified line.

For this organization, the illustrated cursor position register 68 has a cursor line register 74 and a cursor character register 72. The line register stores the line digits and the character register stores the character-position digits of the cursor position number. One input to each register 72 and 74 is from the accumulator register 60, and the output from each register feeds the arithmetic bus 54 and a further bus discussed below.

The display position register 70 stores information identifying the position on the display screen 36*a* to which the CRT electron beam is directed. As is the practice in television receivers, the illustrated display unit sweeps the CRT electron beam across the tube face in successive, vertically spaced traces. Further, traces in one sweep through the screen are interleaved between the traces on the next sweep. The set of traces of one full sweep of the screen are referred to here as a field. One field can hence be considered as presenting the even-numbered traces and the next field as presenting the odd-numbered traces. A line of characters is formed from a number of traces and, similarly, each interline space is several traces wide. The illustrated processor forms each line of characters with ten traces, five in each field, and forms each space with six traces, three in each field; all by way of example.

With this organization of the display unit, the display position register 70 has a character counter 76, a trace counter 78 and a line counter 80. The character counter receives timing pulses from a timing unit 94 to count to successive character positions as the CRT beam sweeps through each trace. The character counter automatically increments the trace counter by one count and resets itself to zero each time it is incremented one count beyond the number of character positions in a line. The trace counter 78 thus counts the traces in each field as they are being swept. It automatically increments the line counter by one count, and is reset to ZERO, each time it is incremented beyond the number of traces in one line plus one space, i.e. here when it is incremented from the count of seven (five line-forming traces plus three space-forming traces with the first traces being counted as zero). The line counter 80 in turn contains a count identifying the line (including the space thereunder) being swept. When it is incremented from the count identifying the maximum number of lines on the CRT screen, the line counter switches a field toggle flip-flop 82, discussed further hereinbelow, and is reset to ZERO so that it is then ready to count the lines in the next field.

The display unit synchronizing and blanking control circuits 32 decode the counts in the character counter 76 and in the line counter 80 and in the trace counter 79 to synchronize the display unit operation with operation of the processor. In particular, the circuits 32 produce the flyback signal, that returns the CRT electron beam to begin each new trace, in response to the count in the character counter. Further, the circuits 32 decode the count in the line counter 80 and trace counter 79 to signal the end of each full sweep of a field on the display screen 36*a*.

It should be kept in mind that the description herein of logic components and how they operate is at times simplified for clarity of exposition. Such details as are omitted involve only matters within the competence of one skilled in this art. For example, a full and exact description of processor components such as the character counter and line counter and others operating with the CRT information display can be found in the text "Television Engineering Handbook," edited by Donald G. FINK and published by the McGraw-Hill Book Company Inc., 1957.

With further reference to the left side of FIG. 3, the processor has an auxiliary arithmetic unit 84 that performs binary arithmetic operations, i.e. addition and subtraction, with the numbers applied thereto, and then transfers the resultant to an associated auxiliary arithmetic register (AAR) 87. The unit 84 can employ a conventional organization of operand selection circuits, a binary adder, and a decoder to sense when the result of an arithmetic operation is all ZEROS. A "Carry-Out" line 85 applies the carry-out, sign and other condition signals from the unit 84 to the condition decoder and register 67 for processing in the same manner as the condition signals from adder 58.

The conductors of an auxiliary arithmetic bus 86 are connected to receive the contents of the memory address register 48, the program counter 66, the registers 72 and 74 of the cursor position register 68, and the character counter 76 of the display position register 70. Further, the bus 86 is connected to the input terminals of the auxiliary arithmetic unit 84. Thus the contents of the memory address register, the program counter, the cursor position register, and the character counter can be applied to the auxiliary arithmetic unit 84.

An output line 88 is connected to transfer the contents of the auxiliary arithmetic register 87 to any one of the memory address register, the program counter, the cursor position register and the memory data bus 64.

The foregoing arrangement in the processor of the bus 86 and line 88 and of the logic components they interconnect is particularly useful during refresh operations, as is discussed further below. In general, it is provided so that the auxiliary arithmetic unit 84 can formulate memory address for both compute and for refresh operations. It also enables certain address information to be compared with other data in an efficient manner.

The remaining logic components of the processor 16 shown in FIG. 3 are a start line register 90, a subtractor 92, a blinking timer 93, a timing unit 94, a refresh/compute control unit 96 and a processor control unit 98.

The start line register 90 stores a number identifying the uppermost line on the display screen 36*a* at which a message is to be displayed. It is used, for example, where the operator is displaying short messages and wants to display them in the middle of the display screen. Thus, where the operator wants to have the top line of a message be displayed starting at the tenth line down on the display screen 36*a*, the start line register is loaded to store the number ten, or whatever other number identifies the tenth line on the display screen. The input to the start line register 90 is from the accumulator register 60. This enables the register 90 to be loaded from the processor memory 46, or from the keyboard unit or some other device by way of the I/0 bus data input conductors 56.

The contents of the register 90 are applied to the subtractor 92, which is also connected to receive the contents of the line counter 80 in the display position register 70. The subtractor output is connected with the auxiliary arithmetic bus 86 so that the contents thereof can be transferred to the auxiliary arithmetic unit 84.

The blinking timer 93 is a conventional data terminal component used to signal when it is time to display the cursor pattern, which generally is blinked on the display screen 36A at a relatively slow rate so that the operator perceives the pattern as blinking on and off. The illustrated timer 93 includes a counter that is incremented each time it receives a signal which the field toggle flip-flop 82 produces when it switches to one of its two states. As discussed further below, when the blinking timer contains a specified count coincident with the CRT beam being directed to the cursor position as stored in register 68, the cursor pattern is displayed on the display screen 36A.

Timing unit 94 applies timing pulses to the control units 96 and 98 and to the counters of the display position register 70. It also connects with other logic components of the processor as is conventional in digital data processors; these connections are not shown.

Function of Refresh/Compute Control Unit

The refresh/compute control unit 96 monitors the operation of the processor and of the display unit and causes the processor to transfer from compute operation to refresh operation, and allows it to transfer back to compute operation, at the appropriate times. The principal task of this unit is to allow the processor to perform compute operations, i.e., operations other than the refresh of the CRT display of characters, for the maximal time consistent with efficient operation of the display unit and with the relatively low cost and flexible arrangement of the processor.

In general, the refresh/compute control unit 96 operates as follows. As the cathode ray tube beam starts to sweep down the display screen, the subtractor 92 compares the contents of the line counter 80 with the contents of the start line register 90, and the refresh/compute control unit receives the resultant number from the subtractor. When the subtractor indicates that the number in the line counter 80 identifies a line above the start line identified by the contents of register 90, the control unit 96 allows the processor to perform compute operations. The control unit 96 switches the processor to refresh operation only when the cathode ray tube starts to sweep the line identified by the contents of the start line register i.e., the top line in which a message is being displayed.

The refresh/compute control unit also receives the count in the trace counter 78. When the contents of this counter indicate that the display unit is sweeping traces that form a line (below the line in the start line register 90), the refresh/compute control unit responds by maintaining the processor in refresh operation so that information displayed in this line will be refreshed. However, when the trace counter contents identify that the display unit is sweeping the traces that form an interline space, the refresh/compute control unit signals the processor control unit 98 that it can resume compute operations. For example, with the foregoing illustrative example where five traces in a field are used for lines and three traces for spaces, the control unit 96 decodes the trace counter contents identifying the five traces of the line to signal the processor for refresh operation, but decodes the three counts of the counter 78 identifying interline space traces to signal the processor to perform computational operations.

In the same manner that refresh/compute control unit signals the processor control unit 98 for computational operations when the display unit is sweeping lines above the first line at which a message is to be displayed, i.e., above the line identified by the contents of the start line register 90, the control unit 96 signals the processor control unit 98 to revert to computational operations when the display unit is sweeping lines below the lowest line at which a message is to be displayed. For this purpose the processor can include a further register, i.e. a last line register 102, and a further comparator 104 for determining when the display unit is tracing lines above the last line at which a message is to be displayed. The logic units 102 and 104 and their connections in the processor are shown with dotted lines because they are optional. The illustrated processor preferably achieves the same result without these units by having the last character of a message to be displayed be followed with a function character that the character decoder 38 decodes to signal the control unit 96 that the last, bottom, character of a message has been displayed. When it receives this "last character decoded" signal from the character decoder 38 in the display unit, the refresh/compute control unit signals that the processor can terminate refresh operation and resume compute operation.

Thus the refresh/compute control unit 96 in the present processor arrangement allows the processor to perform compute operations all the time when the display unit is sweeping the cathode ray tube electron beam above the first line at which a message is to be displayed, when it is sweeping the beam through the interline spaces, and when it is sweeping the beam below the last line of a message. It should be noted that this operation of the processor in no way detracts from the operating speed of the display unit.

With this arrangement of the refresh/compute control unit 96, a processor embodying the invention is free to perform compute operations over a large percentage of the operating time.

Logic Design of Refresh/Compute Control Unit

Figure 4:
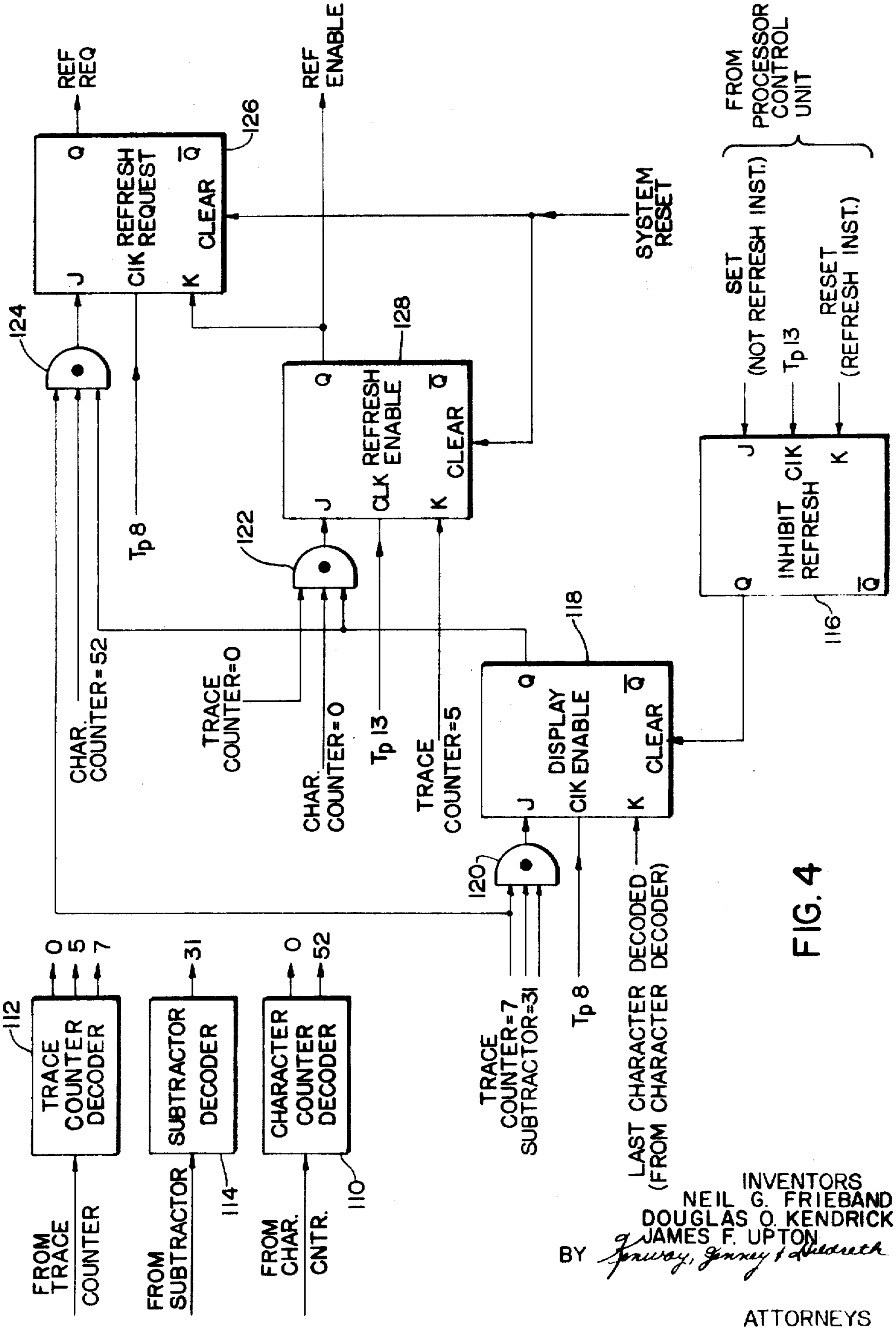
FIG. 4 is a functional logic block diagram of a refresh/compute control unit for use in the processor of FIG. 3.

FIG. 4 shows a construction, in functional logic format sometimes referred to as English logic, of a refresh/compute control unit for operation in accordance with the invention. The description assumes, by way of example, that the processor timing unit 94 (FIG. 3) produces a succession of twenty timing pulses in each cycle of the processor operation, and repeats the succession over and over. Further by way of example, assume that the display unit 24 of FIGS. 2 and 3 refreshes the display produced with a single trace through two character positions during each such 20 -timing pulse cycle of the processor operation.

With specific reference now to FIG. 4, the illustrated refresh/compute control unit has three decoders 110, 112 and 114 that respectively receive the signals stored in the character counter 76, in the trace counter 78 and in the subtractor 92, all in FIG. 3. The character counter decoder 110 produces output signals on different output terminals when the character counter contains the count corresponding to the decimal number zero and when it contains the count identifying the decimal number 52. Similarly, the trace counter decoder 112 produces separate output signals when the trace counter contains the binary numbers identifying the decimal numbers zero, five and seven; and the subtractor decoder 114 produces an output signal when the subtractor contains the binary number identifying the decimal number 32.

The refresh/compute control unit responds to these signals from the decoders 110, 112, and 114 with a logic circuit functionally constructed with flip-flops and AND circuits. The flip-flops are illustrated as so-called JK flip-flops, which are of conventional design and operation. Further, the control unit provides the operation set forth above after the processor has executed a programmed Refresh instruction, i.e. an instruction calling for refresh operation. Conversely, when the processor is to operate without refreshing a display, the refresh/compute control unit is effectively turned off by programming the processor to execute a Not Refresh instruction. The execution of the Not Refresh instruction causes the processor to apply a "set inhibit refresh" signal, typically produced in the processor control unit 98 of FIG. 3, to the J input of an inhibit refresh flip-flop 116. Later in the processor cycle executing this instruction, illustrated as time 13, the flip-flop 116 receives a timing pulse (tp) and switches to the ONE state. In this state, the flip-flop 116 produces a binary ONE signal at its Q output. This signal is applied to the clear input of a display enable flip-flop 118, thereby constraining the latter flip-flop in the ZERO state. In this condition, flip-flop 118 does not respond to the other signals applied to it and accordingly the refresh/compute control unit is inactive.

On the other hand, when the processor is executing a Refresh instruction, it applies a reset signal to the K input of the inhibit refresh flip-flop 116. Thereafter, timing pulse 13 in the same execution cycle resets the flip-flop to the ZERO state. This removes the ONE signal from the Q output, and similarly removes the clear signal from the flip-flop 118, thereby releasing the control unit for refresh operation.

With flip-flop 116 reset by the execution of a Refresh instruction, the control unit of FIG. 4 remains quiescent so long as the display unit 24 (FIG. 2) is sweeping traces on the display screen 36A above the first line where a display appears, i.e. above the line identified by the number in the start line register 90 (FIG. 3). This is because the subtractor 92, which contains the binary number resulting from subtracting the contents of the first line register 90 from the contents of the line counter 80, identifies a decimal number other than 31 and hence the FIG. 4 decoder 114 does not produce the indicated output signal. (It can be shown that the subtractor 92 contains the binary equivalent of the decimal number 31 only when the line counter identifies the line immediately above the line in the start line register, i.e. when the binary number in the start line register is one binary count higher than the binary number in the line counter.)

However, when the display unit 24 begins to sweep the last trace of the interline space immediately preceding the first line of the display, the FIG. 3 trace counter 78 contains the binary number identifying the decimal number seven, and the subtractor 92 contains the binary number identifying decimal 31. With these trace counter and subtractor contents, the FIG. 4 decoders 112 and 114 apply the designated signals to an AND gate 120, and in response the gate applies a ONE signal to the J input of flip-flop 118. Timing pulse eight in the same processor cycle is applied to the clock input of this flip-flop and sets it to the ONE state, where it develops a binary ONE at its Q output terminal. This signal enables one input both on a three-input AND gate 122 and on a three-input AND gate 124. A second input to AND gate 124 is the signal from the trace counter decoder 112 identifying that the display unit is sweeping the display beam across the seventh trace, i.e. the last trace of an interline space.

Thereafter, as the display unit nears the end of this last trace immediately prior to commencing the sweep across a line where characters are to be displayed, illustratively at the point where the character counter indicates that the display unit is directing the electron beam at the 52 character position in the 64 character trace, the character counter decoder 110 enables the remaining input to AND gate 124. The resultant ONE signal from the gate is applied to the J input terminal of a refresh request flip-flop 126.

Timing pulse eight in this processor cycle is applied to the clock input of flip-flop 126 and accordingly switches it to the ONE state. The resultant ONE signal at the Q output of the flip-flop is a Refresh Request signal which is applied to the processor control unit 98.

In response to the Refresh Request signal, the processor control unit 98 continues to process whatever instruction it is working on, and then halts operation, i.e. the Refresh Request signal inhibits the processor control unit from fetching a new instruction.

Six processor cycles later, which is the time in the illustrated example required for the display unit to advance its sweep from character position 52 to the end of the trace position 64, the character counter is incremented from its full count identifying the 64 character position and is cleared to all ZEROS. This increments the trace counter from its maximum count of seven to all ZEROS. The character counter decoder 110 and the trace counter decoder 112 of FIG. 4 respond to these conditions and apply enabling signals to the other two input terminals of AND gate 122. In response, the AND gate applies a ONE signal to the J input of a refresh enable flip-flop 128. The next timing pulse 13 is applied to the clock input terminal of this flip-flop and accordingly switches it to the ONE stated. The resultant ONE signal at the Q output terminal of the refresh enable flip-flop is denominated a Refresh Enable signal, and is applied to the processor control unit 98 to cause it to commence refresh operation. The Refresh Enable signal is also applied to the K input of refresh request flip-flop 126, thereby clearing this flip-flop with the next timing pulse eight and readying it for further operation.

With further reference to FIGS. 3 and 4, in response to the Refresh Enable signal, the processor control unit 98 operates the processor and the display unit 24 to refresh the display on the display screen 36A. The refresh operation proceeds in the manner described above, with the display unit successively refreshing the five traces that constitute the first line of the display. In the illustrated embodiment, these traces are identified with the trace counter numbers identifying the decimal numbers zero, one, two, three and four. Accordingly when the trace counter is incremented to identify the decimal number five, the display unit is ready to sweep the electron beam across the three traces forming the space between the first and second lines of the display.

The trace counter decoder 112 in FIG. 4 responds to this number in the trace counter and, as indicated, applies an enabling signal to the K input of refresh enable flip-flop 128. The following timing pulse thirteen then resets the flip-flop 128 to the ZERO state. This removes the Refresh Enable signal. Accordingly, the processor is released to resume compute operation, beginning with the instruction identified by the contents of its program counter 66. In this manner, the processor is released to perform compute operations throughout the display unit operation whenever the display beam is swept through interline traces. As the display unit nears the end of this interline space tracing, the trace counter is advanced to the count identifying the decimal number seven and the character counter is advanced to the number identifying decimal 52. In response, decoders 110 and 112 activate AND gate 124 to enable the refresh request flip-flop 126 to produce another Refresh Request signal. Thereafter, as the display position register 70 of FIG. 3 is incremented to the condition where the character and trace counters are cleared, the FIG. 4 AND gate 122 enables the J input of the refresh enable flip flop 128. This flip-flop then becomes set and again produces a Refresh Enable signal, which causes the processor control unit 98 to commence the refresh operation for the next line of the display.

This operation continues with the refresh/compute control unit signaling the control unit 98 to perform refresh operation only during the sweeping of display lines, and not during the sweeping of interline spaces or lines or spaces above the designated display area. The operation stops when the processor, during refresh operation, reads from the memory 46 and applies to the FIG. 2 display unit character decoder 38 a character coded to designate the end of a display. This control character is stored in the memory location next following the location of the last character in the message being displayed. In response to this control character, the character decoder applies a Last Character Decoded signal to the K input of flip-flop 118. The subsequent timing pulse eight resets the flip-flop to ZERO, thereby disabling AND gates 122 and 124. This inhibits the Refresh Enable Signal, and accordingly the processor control unit 98 is free to perform compute operations until the display unit, during the next frame, again begins sweeping the display beam across the first line of the display.

Refresh Controlling Circuit Of Processor Control Unit

Figure 5:
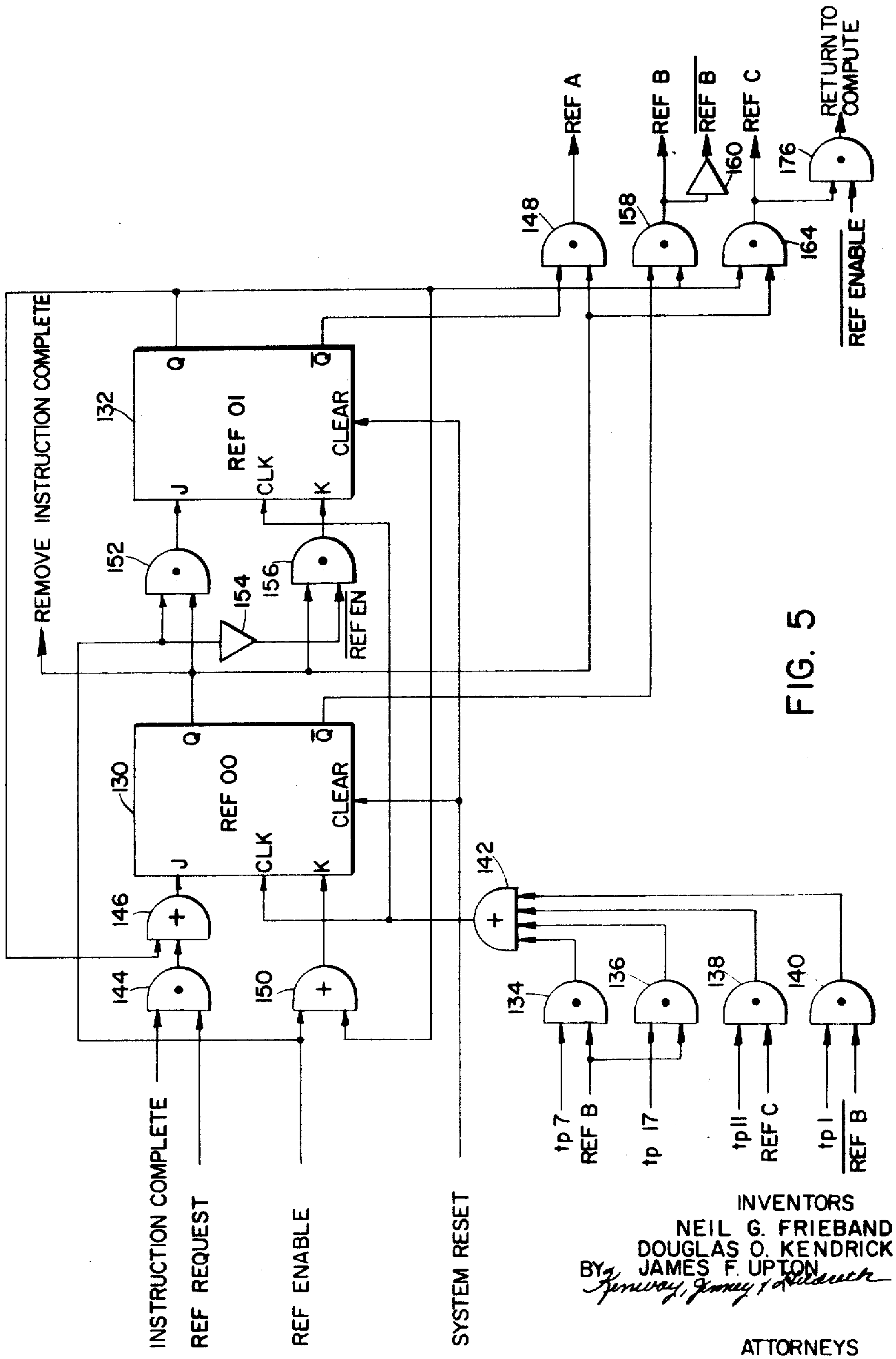
FIG. 5 is a functional logic block diagram of refresh controlling circuits of a processor control unit for use in the processor of FIG. 3.

FIG. 5 shows the logic circuit in the FIG. 3 processor control unit 98 which responds to the Refresh Request and Refresh Enable signals from the refresh/compute control unit 96. This refresh controlling circuit develops control signals denominated Refresh A (Ref A), Refresh B (Ref B), and Refresh C (Ref C), for operating gate circuits that cause the processor to perform the actual refresh operation. FIG. 5 shows a logical functional representation of the control circuits in the same manner as FIG. 4, and it employs two flip-flops 130 and 132 of the JK type. The FIG. 5 refresh controlling circuit produces clock pulses for operating the flip-flops 130 and 132 in response to four timing pulses from the processor timing unit 94 (FIG. 3). This is done with AND gates 134, 136, 138 and 140, the outputs of which are OR'd together by gate 142 to feed the flip-flop clock terminals. Specifically, AND gate 140 applies timing pulse one to the flip-flop clock inputs only when the $\overline{\text{Refresh B}}$ signal is present, i.e. when the Refresh B signal is not present. On the other hand, the Refresh B signal enables AND gates 134 and 136 to apply timing pulses seven and seventeen respectively to the flip-flop clock inputs. AND gate 138 applies timing pulse 11 to the clock inputs when the Refresh C signal is present.

Assume initially that flip-flops 130 and 132 are each in the Zero state; typically a System Reset Signal produced when the processor is first energized by turning power on places the flip-flop in this condition.

Thereafter, as described with reference to FIG. 4, during the processor operation, the refresh/control unit applies the Refresh Request signal to AND gate 144. As also discussed above with reference to FIG. 4, this signal is produced when the display unit is sweeping the last trace of an interline space before a display line, and specifically when the display beam is approximately 12 character positions from the end of that trace. This 12 character lead time before starting the first sweep of the display line is equivalant to a six cycle lead time using the example assumed above. This is the maximum time which the present illustrative processor needs to complete the execution of an instruction it has commenced prior to receipt of the Refresh Request signal.

When the processor completes the current instruction, it produces an Instruction Complete signal, as is conventional in digital data processors. This signal also is applied to AND gate 144, and in response to the two signals it now receives the gate supplies a ONE output signal through an OR circuit 146 to the J input of flip-flop 130.

At this time, with both flip-flops 130 and 132 in the ZERO state, AND gate 140 is enabled by the $\overline{\text{Refresh B}}$ signal and hence the next timing pulse one is applied to the flip-flop clock inputs through gates 140 and 142. In response to this clock pulse, flip-flop 130 is set in the ONE state, inasmuch as the AND circuit 144 is applying a ONE signal to its J input and the K input is receiving a ZERO signal. The J AND K inputs of flip-flop 132 are receiving ZERO signals and hence this flip-flop does not change state in response to timing pulse one.

Thus, after the occurrence of timing pulse one, flip-flop 130 is in the ONE state and flip-flop 132 is in the ZERO state. The resultant ONE at flip-flop 130 Q output and one at flip-flop 132 $\bar{Q}$ output activate AND gate 148 to produce the Refresh A signal. The Q output terminal of flip-flop 130 is also connected within the control unit 98 to remove the Instruction Completion signal and accordingly AND circuit 144 is deactivated. The processor is now in the refresh state.

The refresh controlling circuit of FIG. 5 remains in this condition until the refresh/compute unit 96 (FIG. 4) produces the Refresh Enable signal. This signal is applied to an OR gate 150, the output of which is connected to the K input of flip-flop 130, and is applied to an AND gate 152, the output of which is connected to the J input of flip-flop 132. The other input of AND gate 152 already is receiving a ONE signal from the Q output terminal of flip-flop 130. Accordingly, gate 152 supplies a ONE signal to the J input of flip-flop 132.

The Refresh Enable signal is further applied to an inverter 154 that applies a ONE signal to an AND gate 156 when the Refresh Enable signal is absent, i.e. when the $\overline{\text{Refresh Enable}}$ signal is present. The other input to AND circuit 156 is produced at the Q output of flip-flop 130, and the gate output signal is applied to the K input of flip-flop 132.

With this arrangement, and when flip-flop 130 is in the ONE state and flip-flop 132 is in the ZERO state, which is the condition when the Refresh A signal is being produced, and then the Refresh Enable signal appears, flip-flop 130 receives a ONE only at its K input terminal and flip-flop 132 receives a ONE only at its J input terminal. Accordingly, timing pulse one of the next cycle causes both flip-flops to change state, flip-flop 130 being reset to ZERO and flip-flop 132 being set to ONE. The resultant output signals from the flip-flops actuate an AND gate 158 to produce the Refresh B signal; when AND gate 158 is not activated, an inverter 160 produces the $\overline{\text{Refresh B}}$ signal, which enables AND gate 140 to gate timing pulse one to the clock inputs of the flip-flops 130 and 132.

The Refresh B signal enables both AND gates 134 and 136. Accordingly, the ensuing timing pulse seven complements flip-flop 130, switching it to the ONE state. Both flip-flops are now in the ONE state and their Q output signals activate an AND gate 164 to produce the Refresh C signal. This signal, in turn, enables AND gate 138 to apply timing pulse eleven to the clock input of the flip-flops and in response flip-flop 130 is complemented to the ZERO state. Flip-flops 130 and 132 are now in the ZERO and ONE states respectively, and AND gate 158 again produces the Refresh B signal.

As the processor cycle proceeds to timing pulse seventeen, gate 136 applies it to the flip-flop clock input. The pulse causes flip-flop 130 to complement to the ONE state, and makes no change in flip-flop 132 so it remains in the ONE state. AND gate 164 again responds to the resultant flip-flop output signals to produce the Refresh C signal.

When the next processor cycle begins, provided the Refresh Enable signal is still present, timing pulse one complements flip-flop 130 to the ZERO state while flip-flop 132 remains unchanged in the ONE state. Accordingly the refresh controlling circuit again produces the Refresh B signal, just as it did in response to timing pulse one of the preceding cycle.

Thus, so long as the refresh enable flip-flop in FIG. 4 remains in the ONE state so that the Refresh Enable signal is present at the FIG. 5 AND gate 150, the FIG. 5 refresh controlling circuit repeatedly switches to produce the Refresh B signal and the Refresh C signal alternately.

However, when the Refresh Enable signal is not present after the FIG. 5 circuit produces the Refresh C signal in response to timing pulse seventeen, AND gate 156 is activated and returns the processor control unit to the compute state. Also timing pulse one of the next cycle switches both flip-flops to the ZERO state.

Thus, to summarize the operation of the FIG. 5 refresh controlling circuit, flip-flops 130 and 132 are both in the ZERO state when the processor is in the compute state. The coincidence of the Refresh Request and Instruction Complete signals cause the circuit to transfer the processor to the refresh state by switching flip-flop 130 to the ONE state, and the Refresh A signal is produced. Thereafter, when the Refresh Enable signal appears, timing pulse one switches the flip-flops 130 and 132 to the ZERO and ONE states respectively; in this condition the Refresh B signal is produced. Timing pulse seven places both flip-flops in the ONE state so the Refresh C signal is produced, and timing pulse eleven returns the circuit to the condition where the Refresh B signal is produced. Timing pulse seventeen then operates the flip-flops to produce the Refresh C signal. This sequence of Refresh B-Refresh C-Refresh B-Refresh C repeats in the next processor cycle provided the Refresh Enable signal remains present. On the other hand, when Refresh Enable terminates, after producing the Refresh C signal for the second time in the processor cycle, i.e. in response to timing pulse seventeen, the subsequent timing pulse one switches both flip-flops to the ZERO state and the processor returns to the compute state.

Refresh Operation of Processor Control Unit

The individual operations which the processor control unit performs during refresh operation, with the Refresh A, Refresh B and Refresh C signals, are now described with reference to the flow chart of FIG. 6. Specific logic circuits for carrying out these operations are not described further because they can be constructed readily according to known techniques.

As discussed with reference to FIGS. 4 and 5, when the refresh request flip-flop 126 is set to ONE and an Instruction Complete signal is present, the processor control unit 98 produces the Refresh A signal. This operation is shown at the beginning of the FIG. 6 flow chart with decision box 190 and the transition to the ensuing action box 192.

As shown in box 192, when the Refresh A signal is present, throughout the rest of the twenty timing pulse cycle, gates are enabled to apply the contents of the FIG. 3 character counter (Char Cntr) 76 and the contents of the subtractor (Sub) 92 to the auxiliary arithmetic bus (AA Bus) 86. In addition, the auxiliary arithmetic unit (AAU) 84 receives a signal commanding it to add zero to whatever number it receives from bus 86. The add zero operation is simply the mechanism by which the information on the bus 86 is transferred into the auxiliary arithmetic unit 84 without modification.

These gating operations transfer to the auxiliary arithmetic unit 84 the concatenation of the line number identified in subtractor 92 and the character position number in character counter 76. As discussed below, this composite number identifies the memory 46 location storing the identity of the character being displayed at that line and character position. Thus the auxiliary arithmetic unit 84 now contains the address of the memory location storing the identity of the next character to refreshed.

As further indicated in action box 192, this information is transferred to the auxiliary arithmetic register (AAR) 87 with timing pulse eighteen and immediately thereafter timing pulse nineteen transfers the address to the memory address register (MAR) 48.

Figure 6:
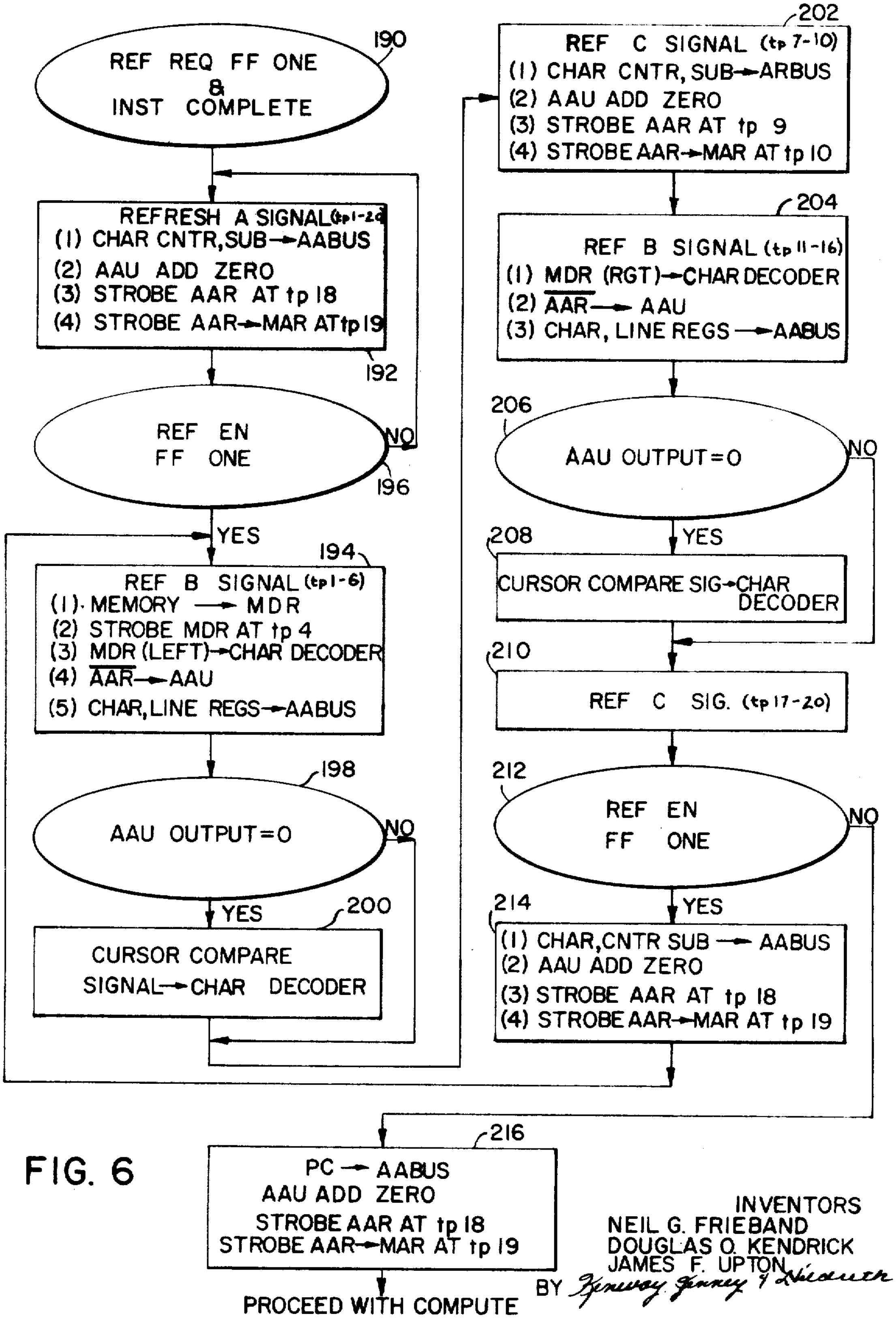
FIG. 6 is a flow chart of refresh operations which the processor control unit causes the processor of FIG. 3 to perform.

As described above with reference to FIG. 5, the processor control unit does not produce the Refresh B signal, and correspondingly does not proceed to the next action box 194 in FIG. 6, unless the refresh enable flip-flop is set to ONE, as indicated with decision box 196. In the event this flip-flop is not set, the processor control unit repeats the actions indicated in box 192, and in each processor cycle the contents of the character counter and of the subtractor are different from what they were during the preceding cycle.

When the refresh enable flip-flop is a ONE so that the decision determined with box 196 is affirmative, the processor control unit circuits produce the Refresh B signal with the next timing pulse one. As further indicated in box 194, the Refresh B signal gates subsequent timing pulses to perform a read memory operation using the memory address assembled with the operation shown in box 192. Timing pulse four strobes the character identification read from memory into the memory data register (MDR) 50.

The illustrated processor stores in each memory location the identification of two characters displayed in successive character positions on the display screen 36A. Accordingly the memory read and memory data register strobe operations performed with box 194 read two characters from the memory and store both in the memory data register, one in the left half and other in the right half of the register. Further, the memory address assembled in the memory address register identifies with its least significant bit whether the left-stored character or right-stored character is being called for; this bit of the memory address is not supplied to the memory to steer the read operation to the desired memory address. However, this bit is used to gate only one-half of the memory data register to the arithmetic bus 54 to transfer the specified character to the character decoder in the display unit.

With these considerations in mind and as indicated in action box 194 of FIG. 6, during time periods one through six, the contents of half the memory data register stages are gated to the character decoder. Box 194 shows, by way of example, that the left half is being transferred. This operation accordingly transfers the character identified by the memory address register contents to the display unit character decoder. The display unit displays the portion of this character which is contained in the trace being swept at this time.

As also shown in box 194 of FIG. 6, during the same timing periods one through six, the complement of the contents of the auxiliary arithmetic register 87 are applied to the arithmetic unit 84, and the contents of the cursor character and cursor line registers 74 and 72 of FIG. 3 are applied to the auxiliary arithmetic bus 86. These two operations cause the arithmetic unit 84 to subtract the character and line position identified by the contents of the character counter 76 and subtractor 92 from the cursor position, thereby testing whether the display beam is directed to the cursor position. As indicated with decision box 198 in FIG. 6, when the two positions coincide, as indicated by a zero output from the auxiliary arithmetic unit 84, i.e. by AAU output=0, the processor control unit proceeds to action box 200 and applied the Cursor Compare signal to the character decoder in the display unit.

In the absence of a positive comparison, the processor operation bypasses action box 200.

Proceeding with the refresh operation of the processor control unit, the Refresh B signal gates timing pulse seven to produce the Refresh C signal, as shown in action box 202. As also shown in box 202, this signal during the ensuing time periods seven through ten places the memory address of the next character to be refreshed in the memory address register. The address illustratively is formed in the manner discussed above with reference to box 192.

The processor control unit next responds to the coincidence of the Refresh C signal and timing pulse eleven to produce the Refresh B signal. As indicated with action box 204, during the ensuing time periods eleven through sixteen, the Refresh B signal is used to gate the contents of the half of the memory data register identified by the least significant bit of the memory address register contents, illustrated as the right half, to the character decoder by way of the arithmetic bus 54. This operation transfers the identity of a new character to the display unit, which then proceeds to display the portion of that character in the trace currently being swept. Also during time periods eleven through sixteen, the Refresh B signal cause another comparison of the cursor position with the character position currently being displayed. This is done in the manner discussed above with reference to box 194. When the resultant subtraction performed by the arithmetic unit indicates that the two positions are identical, as designated with a "Yes" response from decision box 206, the processor applies the Cursor Compare signal to the character decoder, thereby signaling the display unit to display the Cursor Pattern rather than the designated character. On the other hand, when the comparison decision produces a "No" answer, the control circuits proceed without sending the Compare signal.

In either case, the processor control unit responds to timing pulse seventeen to produce the Refresh C signal, as indicated with action box 210.

As discussed above with reference to FIG. 5, at this juncture the processor control unit tests to see whether the refresh enable flip-flop of FIG. 4 is still set to ONE before proceeding further. If the decision indicated with box 212 is affirmative, the control unit circuits proceed to the actions indicated in box 214, thereby producing in the memory address register the memory address of the next character to be displayed. The processor control unit then returns, at the beginning of the next processor cycle, to the flow chart entry point to action box 194.

On the other hand, when the decision indicated with box 212 is negative, the processor control unit does not proceed to the operations indicated in box 214 but proceeds instead to the operations indicated in box 216. These operations return the processor to the compute state. Specifically, these operations transfer the instruction address stored in the program counter to the auxiliary arithmetic bus, from which it is applied to the auxiliary arithmetic unit 84, and then stores the address in the unit 84 with an add zero operation. The instruction address is further transferred to the auxiliary arithmetic register 87 with timing pulse eighteen and transferred from there to the memory address register with timing pulse nineteen. The processor control unit then proceeds in a normal computional mode, typically by fetching from memory the instruction now addressed by the contents of the memory address register.

The detailed operation of the processor control unit for performing compute operations, and the corresponding construction of appropriate gating and like circuits, can follow conventional practices.

Processor Operation

Further organizational and operational features of a data terminal that stem from the arrangement of the present processor 16 and result from the construction of the refresh/compute control unit and of the processor control unit as described above, are now discussed with reference to an operating sequence in which the processor interrupts the execution of a compute routine to perform refresh operations, and then resumes the compute routine.

Assume that the processor is executing a compute routine including, for example, the two successive instructions: (1) load the accumulator with the contents of memory location 600 (a LD ADDRESS 600 instruction); and (2) add ONE to the contents of the accumulator (an ADD IMMED 001 instruction). Assume further that the two instruction words calling for these two instructions are stored, respectively, at memory addresses 400 and 401.

The processor commences the execution of these instructions in a conventional fashion by performing an instruction fetch cycle in which the LD ADDRESS 600 instruction word is read from memory location 400 and stored in the memory data register 50. This is done under the control of the processor control unit 98, which then operates the processor to send the op code portion of the instruction word to the op code register 52 and to send the address portion of the instruction word to the memory address register 48 by way of the auxiliary arithmetic bus 86 and the auxiliary arithmetic unit 84. The address information is transferred to the unit 84 by way of an add zero operation so that it is not altered.

The processor next proceeds to an execute cycle in which it reads the contents of memory 46 location 600 into the memory data register 50, transfers the contents to the accumulator 60 by way of the adder 58 with an add zero operation, and increments the program counter 66 from the number 400 to the number 401, which as indicated above is the memory location of the next instruction. This completes the execution of the LD ADDRESS 600 instruction.

Assume that while the processor was performing the foregoing fetch and execute cycles for the LD ADDRESS 600 instruction, the refresh/compute control unit 96 issued a signal to the processor control unit 98 indicating that refresh operation should begin shortly, i.e. produced the Refresh Request Signal. Once it has begun an instruction, the processor 16, under control of the processor control unit 98, performs the fetch and execute cycles as just described, even when it receives the Refresh Request. However, at the conclusion of the execution cycle as just described, rather than to fetch the next instruction word from the memory, the control unit 98 switches to the refresh mode of operation. In terms of FIGS. 5 and 6, the control unit at this juncture produces the Refresh A signal.

Under control of the Refresh A signal, the processor proceeds to operate in the refresh mode of operation by loading the memory address register 48 with the address in memory 46 where the identification of the first character in the third line of the displayed message is stored. As discussed, the processor 16 provides the operation by formulating the memory address for each character from the contents of the character counter 76 and subtractor 92.

Assume further that the display unit 24 of FIG. 1 was sweeping the traces in the space between the twelfth and thirteenth display line while the processor was performing the load instruction just described. The Refresh Request signal is produced because the display unit is about to being sweeping the traces that form the thirteenth display line. It will also be assumed that the start line register 90 of the processor stores a binary number identifying the eleventh display line, indicating that the operator is operating the display unit to display the first line of the message beginning at the eleventh display line.

Accordingly, at this juncture where the display unit 24 is about to sweep the first trace of the thirteenth display line, the processor status is as follows: the start line register stores the binary equivalent of the decimal number eleven to identify the eleventh display line, the character counter 76 and the trace counter 78 have each just been reset to zero; the line counter 80 has been advanced to the count identifying display line thirteen and the output of the subtractor indicates the difference between the line counter 80 contents and start line register 90 contents, i.e. stores the binary number indicating that the third line of a message is now to be refreshed. Assume also that the cursor position register 68 indicates that the cursor is positioned at the third character-position in the third line of the displayed message; the cursor character and line registers 72 and 74 then store the identification of this character-position and line.

Also, the program counter 66 contains the number 401 for identifying the next compute instruction that is to be executed, and the accumulator register 60 contains the contents read into it from memory location 600 during the last compute instruction that was executed.

With the processor 16 in this status, the Refresh Enable signal is present and accordingly the processor control unit 98 produces the Refresh B Signal and causes a memory read operation to be performed, which reads the contents of the memory location thus addressed by the memory address register 48 into the memory data register 50. The memory data register then contains the binary number identifying the character being displayed in the first character position of the third message line. This number is transferred to the character decoder 38 (FIG. 2) of the display unit 24 and the display unit, in a conventional manner, generates signals for operating the cathode ray tube therein to display the portion of this character that is displayed with the first trace thereof; the trace identification is supplied to the character generator 30 of the display unit 24 by applying the count in the trace counter 78 to the read only memory 42.

While the display unit character generator 30 is processing the character-identifying information it just received from the memory data register 50, and before the identified character is displayed, the processor control unit 98 determines, illustratively still under control of the Refresh B Signal, whether the identified character should in fact be displayed at this character position or whether, instead, the cursor pattern should be displayed. For this purpose, the processor control unit 98 operates the auxiliary arithmetic unit 84 to compare the display location of the character being refreshed with the display location of the cursor.

The auxiliary arithmetic unit 84 applies the cursor compare signal resulting from this comparison operation, by way of a cursor compare line 106, to the character decoder 38 of the FIG. 2 display unit 24. When the character display position and the cursor position are different, the cursor compare signal causes the character generator 30 to proceed with the character generating operation so that the character will be displayed. On the other hand, when the auxiliary arithmetic unit 84 determines that the two positions coincide, the resultant cursor compare signal causes the character generator 30 to display the identified character in the normal fashion except when the blinking timer 93 identifies that it is time to display the cursor pattern.

As indicated above, in the example being discussed, the cursor position register 68 stores a number identifying that the cursor is positioned at the second character-position in the third line of the message being displayed. Accordingly, with the display position register 70 set to display a character in the first character-position of this line, the auxiliary arithmetic unit 84 produces a negative cursor comparison signal. Hence, the display unit 24 proceeds to display the identified character.

Simultaneous with the display unit 24 sweep of the CRT trace from the first character position to the next character position, the timing unit 94 increments the character counter 76 by one count. The processor control unit 98 now produces the Refresh C signal and next applies the new character count and the line number output from the subtractor 92 to the memory address register by way of the auxiliary arithmetic unit 84 to address the memory 46 location storing the identification of the character to be displayed in the second character-position of the line being traced. After this character identification is read from the memory and then transferred, under control of the next Refresh B Signal from the memory data register to the display unit character generator 30, the auxiliary arithmetic unit 84 is again operated to compare the cursor position contained in the cursor position register 68 with the character display position which the arithmetic unit 84 now contains. This comparison again produces a negative cursor compare signal and the display unit 24 displays the character identified for the second character position.

However, during the refresh of the character being displayed in the third character position, the auxiliary arithmetic unit produces a positive cursor comparison signal and applies it via the line 106 to the display unit character generator 30. By way of illustration, this signal can enable a gate (not shown) in the character generator 30 to cause the character decoder 38 therein to display the cursor pattern when the blinking timer 93 identifies that it is time to blink the cursor pattern on the display screen.

Thereafter, the processor and display unit continue to refresh the portion of the message being displayed with the first trace of the third message line. When the electron beam of the display tube is swept to the end of the trace, the character counter 76 is incremented accordingly, and becomes reset to zero and it increments the trace counter 78 by one count so that now the display position register identifies the first character position in the second trace of the third message line.

The processor control unit 98 continues refresh operation in this manner through all five traces that form the third message line. Thereafter, when the trace counter 78 is incremented from identifying the fifth trace, i.e. the last one in the line, to the next trace, i.e. the first one in the space between the third and fourth line of the message, the refresh/compute control unit 96 removes the Refresh Enable signal, thereby signalling the processor control unit 98 to terminate refresh operation.

This frees the processor to resume compute operations. The processor control unit 98 accordingly switches to the compute mode and immediately initiates an instruction fetch cycle from the memory address stored i the program counter 66. In the present example, this is the memory address 401, which stores the ADD IMMED 001 instruction. The processor control unit 98 executes this next instruction by transferring the 001 addend stored in the memory 46 as part of the instruction word in location 401, to the memory data register and thence to the adder 58, where it is added to the number which the accumulator 60 has been storing all through the refresh operation for the third message line.

It should be noted that in the foregoing example, no housekeeping operations were necessary when the processor transferred from compute operation to refresh operation. The program counter 66 and the accumulator register 60 continued to store the information corresponding to the status of the last compute instruction executed, throughout the refresh operation. Similarly, upon resuming compute operation at the end of the refresh operation, the processor again required no housekeeping operations. By maintaining the status of the program counter and accumulator register throughout the refresh operation, the processor is ready immediately to fetch and execute the next instruction in whatever routine it was performing at the time of interruption to transfer to refresh operation.

Note also that during refresh operation as just described, the auxiliary arithmetic unit 84 both formulated the memory addresses for the characters being refreshed; and compared each such character address with the cursor position, for the purpose of signalling when the cursor pattern should be displayed instead of identified character.

Still other operations which the processor performs by way of the auxiliary arithmetic unit 84 are the incrementing and decrementing of the cursor position number in the register 68. For example, the cursor position number is incremented by one simply by transferring it via bus 86 to the auxiliary arithmetic unit 84, performing an "add 1" operation in the unit 84, and transferring the resultant via the bus 86 back to the registers 72 and 74.

Also, when a new cursor-position number is read from the memory 48, it is transferred to the register 68 by way of the auxiliary arithmetic unit 84. However, when desired, the numbers in either the cursor line or cursor character registers can be manipulated in the accumulator register 60 via the adder 58.

Further features of the provision of the auxiliary arithmetic unit 84, and its associated register 87, are that it serves to select the source of signals applied to the memory address register, and that it enables logic components with which it is connected to be constructed simply as registers instead of the more costly configuration of a counter. For example, although the program counter is denominated herein as a "counter," it can in practice be constructed simply a a register. This is because arithmetic operations required on the program counter contents can be performed in the arithmetic unit 84 and the resultant number returned to the so-called counter 72. Thus, the present processor can have a memory address register 48, a program counter 72, a cursor line register 74, and a cursor character register 72, that has no arithmetic capability, but rather is only a storage unit, i.e. a register.

The data terminal processor construction thus provided in accordance with the invention provides both programmable computational capability and display refreshing capability. The processor employs a configuration of logic components which is simple relative to the extent of operation it provides a user, and relative to efficiency with it performs the multiple operations.

Included in the advantageous features of the processor is the capability to concatenate the contents of the cursor line register and cursor character register in the auxiliary arithmetic unit. This enables the contents of these cursor register units to be used in indirect addressing operations. It also enables the contents of these cursor register units to be incremented or decremented, stored in memory, compared with other numbers and even transferred to the accumulator with minimal instructions and control gating circuits. Further, the processor arrangement enables these cursor register units to be loaded both from the memory and, via the I/O bus data in conductors from an external device such as the keyboard or a reading unit such as is used to enter a program into the processor.

The auxiliary arithmetic unit can also assemble the contents of the character counter and subtractor into a single number for similar operations.

It is noteworthy that many features of the foregoing data terminal processor are applicable to data terminals operating differently from the embodiment disclosed. As an elementary example, the invention is also useful with a display unit that produces a display without the use of interlaced traces. Thus, the processor can, with only slight modification, operate with a display unit that sweeps all the traces of a display screen with every trace.

As a further example, features of the present processor are advantageously applicable for use with a display unit that produces a display by refreshing each character in toto before proceeding to the next character. Such a display unit, by way of specific illustration, can project each character with a selected pattern of dots or strokes. In any event, that type of display unit still operates with display line and character position information of the same kind with which the present processor operates.

It will thus be seen that the objects set forth above, among those made apparent from the preceding description, are efficiently attained. Since certain changes may be made in the above construction without departing from the scope of the invention, all matter contained in the above description or shown in the accompanying drawings shall be interpreted as illustrative within the spirit of the invention.

Having described the invention, what we claim as new and secured by Letters Patent is:

1. An electronic data terminal processor for operation with data display means having a cursor, keyboard means, data communication means, and addressable memory means for storing instructions for said processor and for storing information for display and information received from said keyboard means and information being transferred by way of said communication means, said data terminal processor comprising a. a memory address register for storing the address of a location in said addressable memory means which is to be accessed, b. a memory data register for storing information to be written into said addressable memory means and for storing information read from said memory means, c. a program counter for storing the address in said memory of an instruction to be performed, d. a cursor position register for storing cursor position information identifying the position of the cursor for said display means, e. arithmetic means for performing binary arithmetic operations with binary numbers and storing a resultant number therefrom, f. first connection means for applying to the arithmetic means information stored in any one of said memory address register, program counter, cursor position register and memory data register, g. second connection means for applying information stored in said arithmetic means to any one of said memory address register, memory data register, program counter and cursor position register, and h. control means for selectively operating any of said registers and counter to transfer information to said arithmetic means via said first connection means and, further, to store information from said arithmetic means via said second connection means.

2. A data terminal processor as defined in claim 1 further comprising third connection means connected for applying information stored in said memory data register to said data display means.

3. A data terminal processor as defined in claim 1 further comprising a character position register storing character position information identifying the position on said display means at which a character is being displayed, said character position register being connected with said first connection means and said control means to apply said character position information to said arithmetic means.

4. A data terminal processor as defined in claim 3 in which said control means includes sequencing means for transferring said character position information from said character position register to said memory address register by way of said arithmetic means to form a memory address from said character position information, and alternatively for applying said cursor position information from said cursor register and said character position information from said character position register to said arithmetic means and for operating said arithmetic means to compare said two items of information, thereby to identify when said character position coincides with said cursor position.

5. A data terminal processor as defined in claim 3 in which said control means a. includes sequencing means for transferring said character position information from said character position register to said memory address register by way of said arithmetic means to form a memory address from said character position information, and b. is further arranged for operating said character position register, said arithmetic means, said memory address register, said memory data register and said memory for displaying with said display means characters stored in said memory at addresses identified by said character position information, said control means retaining the status of said program counter unchanged during said displaying operation.

6. A data terminal processor as defined in claim 1 comprising a further arithmetic register connected to receive information from said memory data register and to transfer information stored therein to said memory data register.

7. A data terminal processor as defined in claim 6 further comprising an input/output bus connected at one end with said keyboard means and connected at the other end to apply information from said keyboard means to said further arithmetic register and to apply information stored in said further arithmetic register to said keyboard.

8. A data terminal processor as defined in claim 3 in which a. said control means is operable in one of at least two modes, b. said control means operates in each said mode to formulate in said arithmetic means a memory location address, and to transfer said address to said memory address register, c. said control means operates in a first of said two modes to formulate said address in response to the contents of said program counter, and thereby to read into said memory data register instructions stored in said memory means at locations identified by the contents of said program counter, and d. said control means operates in the second of said two modes to formulate said address in response to the contents of said character position register, thereby to read into said memory data register character-identifying information stored in said memory means at locations identified by the contents of said character position register.

9. A data terminal processor as defined in claim 8 in which said control means maintains the contents of said program counter unchanged during operation in said second mode.

10. A data terminal processor as defined in claim 3 in which said character position register comprises a. first logic means containing a character number identifying the position along a display line on said display means where a character is to be displayed, b. second logic means containing a line number identifying the line on said display means at which a character is to be displayed, c. third logic means for storing a first line number identifying the first line on said display means at which a character is to be displayed, and d. logic comparison means connected with said second and third logic means and producing a number identifying the line at which a character is to be displayed relative to said first line.

11. A data terminal processor for operation in a data terminal having display means for displaying characters at line positions, and having addressable memory means for storing characters to be displayed with each character being stored at a memory location associated with the line position at which the character is to be displayed, said processor comprising a. memory-address generating means producing addresses for characters stored in said memory in accordance with the line position being displayed, b. logic means producing a line position number identifying the line position being operated on by said display means relative to a first line position above which there is to be no display, c. control means 1. responsive to said line position number for operating said processor for nondisplaying operation when said number identifies a line position above said first line position and alternatively for operating said processor for displaying operation when said number identifies a line position at or below said first line position, and 2. operating said memory-address generating means, during said processor displaying operation, to produce said memory addresses in accordance with said line position number so that characters to be displayed in said first line position are stored at memory locations associated with the first line-position.

12. A data terminal processor for operation in a data terminal having character display means, keyboard means and addressable memory means for storing characters selected with said keyboard means and characters to be displayed on said display means, said processor controlling information transfers between said display means, said keyboard means and said memory means, and controlling the display on said display means of characters stored in said memory means, and comprising a. start line register means for storing a start line number identifying the uppermost line of said display means at which characters are to be displayed, b. line register means for storing a line number identifying the line on said display means at which said display means is ready to display a character, c. compare means connected with said start line register means and with said line register means and producing a first comparison resultant only when said stored line number identifies a line on said display means at or below the line which said stored start line number identifies, and d. control means responsive to the comparison resultant of said compare means and enabling said processor to display characters on said display means only when said first resultant is present.

13. A data terminal processor as defined in claim 12 in which a. said addressable memory means includes address register means and stores characters for display on said display means at a memory address corresponding to the line on said display means at which the character is displayed, and b. said compare means develops a difference number identifying the arithmetic difference between said stored line number and said stored start line number and applies said difference number to said address register means to form said character-locating memory address from said arithmetic difference.

14. A data terminal processor as defined in claim 12 a. further comprising means for storing an identification of the last line on said display means at which characters are to be displayed, b. in which said compare means includes means for comparing the contents of said store means with the line number in said line register and for producing a second comparison resultant only when said stored line number identifies a line on said display means below the last line which said store means identifies, and c. in which said control means disables said processor from displaying characters on said display means when said second resultant is present.

15. A data terminal processor as defined in claim 12 a. further comprising last line means for signalling said control means when said stored line number identifies a line on said display means below the last line at which characters are to be displayed, and b. in which said control means disables said processor from displaying characters on said display means when signalled by said last-line means.

16. A data terminal processor for operation in a data terminal having character display means that sweeps a character-displaying beam sequentially through character-displaying line-positions thereon, and further having keyboard means and addressable memory means for storing characters selected with said keyboard means and characters to be disb. is further arranged for operating said character position register, said arithmetic means, said memory address register, said memory data register and said memory for displaying with said display means characters stored in said memory at addresses identified by said character position information, said control means retaining the status of said program counter unchanged during said displaying operation.

6. A data terminal processor as defined in claim 1 comprising a further arithmetic register connected to receive information from said memory data register and to transfer information stored therein to said memory data register.

7. A data terminal processor as defined in claim 6 further comprising an input/output bus connected at one end with said keyboard means and connected at the other end to apply information from said keyboard means to said further arithmetic register and to apply information stored in said further arithmetic register to said keyboard.

8. A data terminal processor as defined in claim 3 in which a. said control means is operable in one of at least two modes, b. said control means operates in each said mode to formulate in said arithmetic means a memory location address, and to transfer said address to said memory address register, c. said control means operates in a first of said two modes to formulate said address in response to the contents of said program counter, and thereby to read into said memory data register instructions stored in said memory means at locations identified by the contents of said program counter, and d. said control means operates in the second of said two modes to formulate said address in response to the contents of said character position register, thereby to read into said memory data register character-identifying information stored in said memory means at locations identified by the contents of said character position register.

9. A data terminal processor as defined in claim 8 in which said control means maintains the contents of said program counter unchanged during operation in said second mode.

10. A data terminal processor as defined in claim 3 in which said character position register comprises a. first logic means containing a character number identifying the position along a display line on said display means where a character is to be displayed, b. second logic means containing a line number identifying the line on said display means at which a character is to be displayed, c. third logic means for storing a first line number identifying the first line on said display means at which a character is to be displayed, and d. logic comparison means connected with said second and third logic means and producing a number identifying the line at which a character is to be displayed relative to said first line.

11. A data terminal processor for operation in a data terminal having display means for displaying characters at line positions, and having addressable memory means for storing characters to be displayed with each character being stored at a memory location associated with the line position at which the character is to be displayed, said processor comprising a. memory-address generating means producing addresses for characters stored in said memory in accordance with the line position being displayed, b. logic means producing a line position number identifying the line position being operated on by said display means relative to a first line position above which there is to be no display, c. control means 1. responsive to said line position number for operating said processor for nondisplaying operation when said number identifies a line position above said first line position and alternatively for operating said processor for displaying operation when said number identifies a line position at or below said first line position, and 2. operating said memory-address generating means, during said processor displaying operation, to produce said memory addresses in accordance with said line position number so that characters to be displayed in said first line position are stored at memory locations associated with the first line-position.

12. A data terminal processor for operation in a data terminal having character display means, keyboard means and addressable memory means for storing characters selected with said keyboard means and characters to be displayed on said display means, said processor controlling information transfers between said display means, said keyboard means and said memory means, and controlling the display on said display means of characters stored in said memory means, and comprising a. start line register means for storing a start line number identifying the uppermost line of said display means at which characters are to be displayed, b. line register means for storing a line number identifying the line on said display means at which said display means is ready to display a character, c. compare means connected with said start line register means and with said line register means and producing a first comparison resultant only when said stored line number identifies a line on said display means at or below the line which said stored start line number identifies, and d. control means responsive to the comparison resultant of said compare means and enabling said processor to display characters on said display means only when said first resultant is present.

13. A data terminal processor as defined in claim 12 in which a. said addressable memory means includes address register means and stores characters for display on said display means at a memory address corresponding to the line on said display means at which the character is displayed, and b. said compare means develops a difference number identifying the arithmetic difference between said stored line number and said stored start line number and applies said difference number to said address register means to form said character-locating memory address from said arithmetic difference.

14. A data terminal processor as defined in claim 12 a. further comprising means for storing an identification of the last line on said display means at which characters are to be displayed, b. in which said compare means includes means for comparing the contents of said store means with the line number in said line register and for producing a second comparison resultant only when said stored line number identifies a line on said display means below the last line which said store means identifies, and c. in which said control means disables said processor from displaying characters on said display means when said second resultant is present.

15. A data terminal processor as defined in claim 12 a. further comprising last line means for signalling said control means when said stored line number identifies a line on said display means below the last line at which characters are to be displayed, and b. in which said control means disables said processor from displaying characters on said display means when signalled by said last-line means.

16. A data terminal processor for operation in a data terminal having character display means that sweeps a character-displaying beam sequentially through character-displaying line-positions thereon, and further having keyboard means and addressable memory means for storing characters selected with said keyboard means and characters to be displayed on said display means, said processor controlling information transfers between said display means, said keyboard means and said memory means, and controlling the display on said display means of characters stored in said memory means, and comprising a. compute logic means for reading instructions from said memory means and executing said instructions,
b. display logic means for reading character-identifying information from said memory means and applying it to said display means for displaying the identified character,
c. character position register means storing information identifying the line on said display means at which said display means is ready to display a character,
d. boundary line register means for storing the identification of a line on said display means beyond which, in a first direction, characters are not to be displayed, and
e. control means responsive to the contents of said character position register means and of said boundary register means, and both enabling said display logic means and disabling said compute logic means only when said character position register means stores the identification of a line at or beyond, in the direction opposite to said first direction, the boundary line identified by said information stored in said boundary line register means.

17. A data terminal processor for operation in a data terminal having character display means that sweeps a character-displaying beam sequentially through character-displaying line positions and interline spaces thereon, and further having keyboard means and addressable memory means for storing characters selected with said keyboard means and characters to be displayed on said display means, said processor controlling information transfers between said display means, said keyboard means and said memory means, and controlling the display on said display means of characters stored in said memory means, and comprising a. compute logic means for reading instructions from said memory means and executing said instructions,
b. display logic means for reading character-identifying information from said memory means and applying it to said display means for displaying the identified character,
c. character position register means storing information identifying the line and space position on said display means at which said display means is sweeping said display beam,
d. control means for operating said character position register to store a number identifying the line-position being swept on said character display means, and
e. decoding means responsive to the contents of said character position register, and both enabling said display logic means and disabling said compute logic means when said character position register means stores the identification of a line position, and alternatively both disabling said display logic means and enabling said compute logic means when said character position register means stores the identification of an interline space.

18. A data terminal processor as defined in claim 17 for operation with display means that sweeps said beam through plural line-segment traces for at least each line position, and a. in which said control means include timing means producing timing signals for controlling the beam-sweeping of said display means,
b. in which said character position register includes a character counter receiving counting signals from said timing means for storing the identification of the character-displaying position of said sweep along each said trace, and further includes a segment counter advanced by said character counter each time said character counter counts through the number of character positions along a trace,
c. further comprising a line counter advanced by said segment counter when said segment counter is advanced through the number of traces in one line plus the number of traces in one interline space,
d. in which said decoding means decodes the count in said segment counter,
e. further comprising boundary line register means for storing the identification of a line position on said display means beyond which, in a first direction, characters are not to be displayed, and
f. further comprising means for comparing the contents of said line counter and said boundary line register means and for enabling said display logic means only when said line counter stores the identification of a line position on said display means at or beyond the line position identified by said boundary line means in the direction opposite to said first direction.

19. A data terminal processor for operation in a data terminal having display means for displaying characters at line positions separated by interline spaces, and having addressable memory means, said processor comprising a. processor control means operable to cause the processor to fetch from said memory and to execute programmed instructions, and alternatively to read character identifications from said memory and deliver them to said display means for displaying the identified character,
b. logic means storing information identifying whether said display means is operating at a line position or at an interline space, and
c. further control means responsive to said information in said logic means and signalling said processor control means to perform said fetch and execute operations when said logic means identifies a space and alternatively signalling said processor control means to perform said character reading operations when a line position is identified.

20. A data terminal processor for operation in a data terminal having display means for displaying characters at line positions, and having addressable memory means for storing characters to be displayed with each character being stored at a memory location associated with the line position at which the character is to be displayed, said processor comprising a. memory address register means for directing read and write operations in said memory means to the memory location identified by the contents thereof,
b. memory data register means for storing information to be written into said memory means and for storing information read from said memory means,
c. program register means for storing the address in said memory means of an instruction to be performed,
d. cursor position register means for storing the display position of the cursor for said display means,
e. arithmetic means connected for performing arithmetic operations on the number stored in any one of said aforementioned register means and for transferring a resultant number thereto,
f. position register means for storing the display position at which said display means is operating and connected to apply the contents thereof to said arithmetic means,
g. control means operative in a compute mode and alternatively in a refresh mode, said control means operating in said compute mode to transfer memory address information from said program register means to said memory address register means by way of said arithmetic means, and
h. said control means operating in said refresh mode to transfer memory address information to said memory address register means from said position register, to transfer information read from said memory means to said display means, and to compare in said arithmetic means the contents of said cursor position means for signalling said display means to display a cursor pattern.

UNITED STATES PATENT OFFICE
CERTIFICATE OF CORRECTION

Patent No. 3,593,316 Dated July 13, 1971

Inventor(s) Neil G. Frieband, Douglas O. Kendrick and James F. Upton

It is certified that error appears in the above-identified patent and that said Letters Patent are hereby corrected as shown below:

Please cancel Columns 21 and 22 since those columns are merely a repeat of Columns 19 and 20.

Signed and sealed this 11th day of January 1972.

(SEAL)
Attest:

EDWARD M.FLETCHER,JR.
Attesting Officer

ROBERT GOTTSCHALK
Acting Commissioner of Patents